United States Patent [19]

Currie et al.

[11] Patent Number: 5,267,418
[45] Date of Patent: Dec. 7, 1993

[54] CONFINED WATER FIXTURE FOR HOLDING WAFERS UNDERGOING CHEMICAL-MECHANICAL POLISHING

[75] Inventors: James E. Currie, Washington; Ronald N. Schulz, Salt Point; Adam D. Ticknor, Beacon, all of N.Y.

[73] Assignee: International Business Machines Corporation, Armonk, N.Y.

[21] Appl. No.: 890,041

[22] Filed: May 27, 1992

[51] Int. Cl.$^5$ .............................................. B24B 41/06
[52] U.S. Cl. ................................. 51/216 R; 51/237 R; 51/216 T; 51/283 R
[58] Field of Search ............... 51/216 R, 236, 237 R, 51/237 M, 216 T, 281 R, 283 R, 119, 120, 125, 131.1, 131.2, 131.3, 235

[56] References Cited

U.S. PATENT DOCUMENTS

| | | | |
|---|---|---|---|
| 3,166,875 | 1/1965 | Litman | 51/216 |
| 3,518,798 | 7/1970 | Boettcher | 51/131 |
| 3,977,130 | 8/1976 | Degner | 51/131 |
| 4,009,540 | 3/1977 | Uijen | 51/235 |
| 4,239,567 | 12/1980 | Winings | 156/154 |
| 4,313,284 | 2/1982 | Walsh | 51/131.4 |
| 4,512,113 | 4/1985 | Bondinger | 51/236 |
| 4,519,168 | 5/1985 | Cesna | 51/216 LP |
| 4,521,995 | 6/1985 | Sekiya | 51/216 R |
| 4,625,463 | 12/1986 | Sekiya | 51/216 R |
| 4,925,518 | 5/1990 | Wasserman et al. | 156/295 |
| 5,101,602 | 4/1992 | Hashimoto | 51/283 R |
| 5,191,738 | 3/1993 | Nakazato | 51/237 R |

FOREIGN PATENT DOCUMENTS 0095567  4/1990  Japan ........................ 51/216 R

*Primary Examiner*—Bruce M. Kisliuk
*Assistant Examiner*—Bo Bounkong
*Attorney, Agent, or Firm*—Harold Huberfeld

[57] ABSTRACT

A wafer polishing fixture is disclosed containing a first liquid film confined by a non-porous but flexible enclosure for distributing evenly the applied polishing forces across the surface of a wafer supported by the confined liquid. The fixture comprises a flexible, non-porous template with a pocket for receiving a wafer to be polished. A washer is placed between a carrier and the template pocket. A film of water fills the bottom of the pocket and is confined with the aid of the washer and by an overlying porous pad extending across the pocket and having a non-porous sheath facing the liquid. A second liquid film saturates and covers the upper surface of the pad. The wafer to be polished floats upon the second liquid film within the pocket.

9 Claims, 1 Drawing Sheet

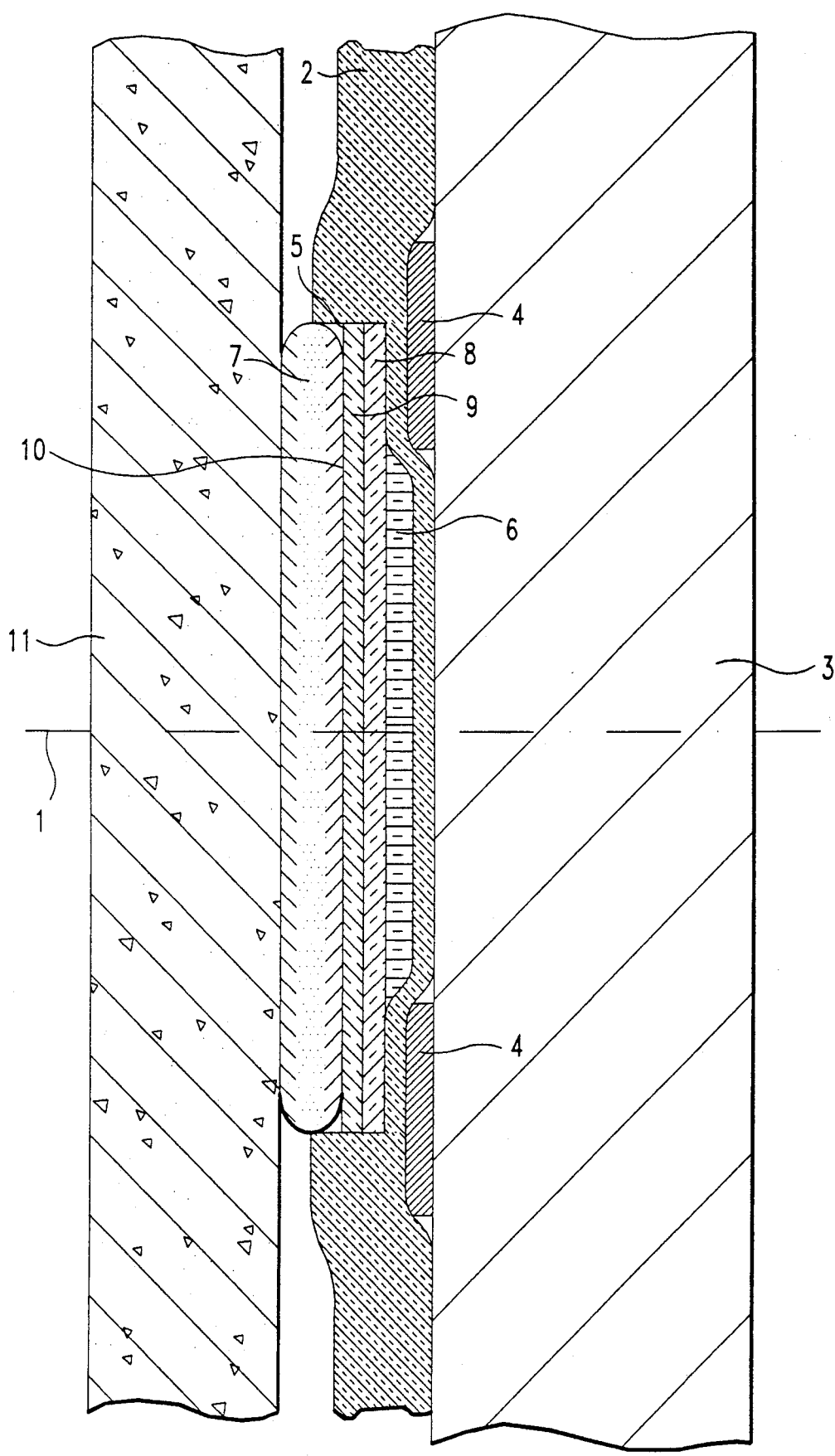

CONFINED WATER FIXTURE FOR HOLDING WAFERS UNDERGOING CHEMICAL-MECHANICAL POLISHING

BACKGROUND OF THE INVENTION

The present invention generally relates to fixtures for the chemical-mechanical (chem-mech) polishing of semiconductor device wafers and, more particularly, to such a fixture adapted to eliminate non-uniform removal of material due to non-uniform loading or flexing of the wafer.

The prior art has focused attention on problems, including non-uniformity of polishing, associated work pieces including semiconductor device wafers. U.S. Pat. No. 3,518,798, issued to Stephen A. Boettcher on Jul. 7, 1970 discloses a polishing machine having a load plate for pressing work pieces to be polished against a polishing wheel. Pressure is applied to the load plate at a location intermediate the center and outer periphery of the load plate, to help reduce the peak deflection of the load plate. Non-uniform polishing within the interior of each work piece is not directly addressed. U.S. Pat. No. 4,313,284, issued to Robert J. Walsh on Feb. 2, 1982 describes the mounting of a number of semiconductor wafers onto a deformable carrier which, in turn, is mounted through a resilient device to a pressure plate in engagement with a bowed polishing surface. The carrier is deformed to match approximately the polishing surface curvature to reduce non-uniformity of the removal of wafer material.

Thus the cited art, in various ways, applies predetermined non-uniform pressure to work piece or to wafer carriers in attempts to compensate for inherent polishing forces that are non-uniformly impressed across the work piece face and which would result in non-uniform removal of wafer material in the absence of some sort of force compensation. That is, in the absence of force compensation, one or more regions of a wafer would be excessively eroded or "dished" during polishing relative to other regions. In each cited prior art instance, a certain degree of design complexity must be tolerated in order to provide the compensatory forces necessary to counteract the inherent polishing forces that otherwise would result in non-uniform removal of wafer material.

SUMMARY OF THE INVENTION

One purpose of the present invention is to provide a fixture for holding and uniformly transmitting polishing force to a wafer to promote uniform removal of material across the wafer face by polishing.

Another purpose is to provide a simplified fixture for uniformly transmitting polishing forces to a wafer through a confined fluid interface.

A further purpose is to provide a simplified fixture for uniformly transmitting polishing forces to a wafer through a fluid confined by the open central region of a washer.

These and other purposes of the present invention, as will appear from a reading of the following specification, are achieved in a preferred embodiment by providing a flexible, non-porous template having a pocket for receiving a wafer to be polished. A washer is placed between a carrier and the template and is centered about the perimeter of the pocket. A thin first film of liquid fills the bottom of the pocket and is confined with the aid of the washer and by an overlying porous pad extending across the pocket and having a non-porous sheath on the pad surface facing the liquid. A second liquid film saturates and covers the other surface of the pad. The wafer to be polished floats upon the second liquid film within the pocket and extends slightly above the top surface of the pocket. The top, exposed surface of the wafer is pressed against a polishing pad and is rotated relative thereto to accomplish polishing action.

The confined first liquid film acts to evenly distribute the applied polishing forces across the surface of the wafer whereby non-uniform removal of wafer material is avoided in a simple yet effective manner.

BRIEF DESCRIPTION OF THE DRAWING

The sole figure is a simplified cross-sectional view of the preferred polishing fixture of the present invention.

BEST MODE FOR CARRYING OUT THE INVENTION

Referring to the figure, the scale has been enlarged for the sake of clarity to show the pocket-containing portion of the fixture of the present invention. As previously noted, the pocket receives the wafer for chem-mech polishing and the figure shown contains all of the features of the invention which evenly distribute the applied polishing forces to provide uniform removal of wafer material during polishing. It will be understood that the figure can be completed simply by revolving it about its axis of symmetry. The axis of symmetry is designated by the numeral 1.

Flexible fiberglass template 2 is directly adherently fixed to carrier 3 except in the area of Kapton washer 4 which spaces template 2 from carrier 3 around the circumference of pocket 5 formed within template 2. Carrier 3 may be of any convenient design such as is shown by the numeral 5 in FIG. 1 designated as "prior art" of cited U.S. Pat. No. 4,313,284. As will be more fully appreciated, after Applicants' polishing fixture has been fully described, washer 4 performs two important functions, i.e., to laterally confine the thin film of water 6 and to provide a smoother (less abrupt) transition along the top surface of wafer 7 where it butts against the top edge of pocket 5.

Water film 6 is confined vertically by a non-porous sheath 8 covering the bottom surface of porous pad 9. Pad 9 is saturated with water so that a thin film of water 10 causes wafer 7 to "float" while also being held by the surface tension of water 10. Wafer 7 is of a thickness such that circuit devices formed in the top surface thereof, if any, extend beyond the top surface of template 2 so as to engage polishing pad 11 when the fixture is brought to bear against the polishing pad during polishing operations. Polishing pad 11 and its supporting structure (not shown) may be of any convenient design, such as are shown by the numerals 19 and 32 in FIG. 1 designated "prior art" of cited U.S. Pat. No. 4,313,284.

It should be noted that washer 4 optionally may be of somewhat reduced diameters so that it may be fitted about the inside perimeter of the bottom of pocket 5. Although washer 4 still would provide its function of laterally confining water film 6, the relocation of washer 4 to be fully within the pocket 5 would reduce its ability to provide the smoothest transition along the top surface of wafer 7 where it meets the top edge of pocket 5.

It also should be noted that although water has been disclosed as the film 6, other liquids may be substituted, e.g., glycol, alcohol or slurry.

It has been found that device wafers undergoing polishing planarization in a typical prior art centerpoint loaded polisher (where the wafer carrier is rotated about its central axis as it is urged against a polishing pad as shown in cited U.S. Pat. No. 4,313,284) exhibit an undesirable "dishing" effect, i.e., the innermost central region of the wafer is removed to a greater extent than is the peripheral region. Much more uniform removal of material has been observed across the face of the wafer, however, when it polished using the fixture of the present invention. It is believed that the confined water film 6, together with washer 4, cooperatively act to distribute the polishing forces evenly across the wafer face to accomplish uniform removal of wafer material by polishing action.

While there have been described what are at present considered to be the preferred embodiments of the present invention, it will be obvious to those skilled in the art that various changes or modifications may be made therein, without departing from the invention, and it is, therefore, aimed in the appended claims to cover all those changes and modifications as follow in the true spirit and scope of the invention.

What is claimed is:

1. A wafer polishing fixture comprising a flexible, non-porous template having a recessed pocket with predetermined inner dimensions for receiving a wafer to be polished,
    a carrier for supporting said template, said template being fixed to said carrier,
    a washer having outer dimensions substantially the same as the inner dimensions of said pocket, a first film of liquid within said pocket,
    a porous pad overlying said liquid and having a non-porous sheath on the pad surface facing said liquid,
    said washer being located, relative to said pocket, to confine said liquid in cooperation with said sheath and said template pocket, and
    a second liquid film saturating and covering said porous pad,
    said wafer floating on said second liquid film.

2. The fixture defined in claim 1 wherein the outer dimensions of said washer are greater than the inner dimensions of said pocket and said washer is placed between said carrier and said template.

3. The fixture defined in claim 1 wherein the outer dimensions of said washer are no greater than the inner dimensions of said pocket and said washer is placed at the bottom of and within said pocket.

4. The fixture defined in claim 1 wherein said first film of liquid is selected from the group comprising water, glycol, alcohol and slurry.

5. The fixture defined in claim 1 wherein said second liquid film is water.

6. The fixture defined in claim 1 wherein the outer dimensions of said washer are greater than the inner dimensions of said pocket,
    said washer is placed between said carrier and said template, and
    said first and second liquid films are water.

7. The fixture defined in claim 1 and further including a polishing pad, said wafer being brought into engagement with said polishing pad by means of said fixture.

8. A method for supporting a wafer to be polished, said method comprising:
    providing a flexible, non-porous template having a recessed pocket with predetermined inner dimensions for receiving said wafer,
    providing a carrier for supporting said template,
    fixing said template to said carrier, providing a washer having outer dimensions substantially the same as the inner dimensions of said pocket, placing a first film of liquid within said pocket,
    providing a porous pad having a non-porous sheath on one surface thereof,
    placing said porous pad to overlie said liquid with said sheath facing said liquid,
    placing said washer, relative to said pocket, to confine said liquid in cooperation with said sheath and said template pocket,
    saturating and covering said porous pad with a second liquid film, and
    floating said wafer on said second liquid film.

9. A wafer polishing apparatus having a fixture comprising a flexible, non-porous template having a recessed pocket with predetermined inner dimensions for receiving a wafer to be polished,
    a carrier for supporting said template, said template being fixed to said carrier,
    a washer having outer dimensions substantially the same as the inner dimensions of said pocket,
    a first film of liquid within said pocket,
    a porous pad overlying said liquid and having a non-porous sheath on the pad surface facing said liquid,
    said washer being located, relative to said pocket, to confine said liquid in cooperation with said sheath and said template pocket,
    a second liquid film saturating and covering said porous pad,
    said wafer floating on said second liquid film, and
    a polishing member adapted to be positioned in contact with said wafer for polishing said wafer.

* * * * *